United States Patent
Maffe'

(10) Patent No.: US 10,272,966 B2
(45) Date of Patent: Apr. 30, 2019

(54) WINDSCREEN SAFETY ASSEMBLY

(71) Applicant: PIAGGIO & C. S.P.A., Pontedera (Pisa) (IT)

(72) Inventor: Francesco Maffe', Pontedera (IT)

(73) Assignee: PIAGGIO & C. S.P.A., Pontedera (Pisa) (IT)

( * ) Notice: Subject to any disclaimer, the term of this patent is extended or adjusted under 35 U.S.C. 154(b) by 0 days.

(21) Appl. No.: 15/326,056

(22) PCT Filed: Jul. 14, 2015

(86) PCT No.: PCT/IB2015/055319
§ 371 (c)(1),
(2) Date: Jan. 13, 2017

(87) PCT Pub. No.: WO2016/009349
PCT Pub. Date: Jan. 21, 2016

(65) Prior Publication Data
US 2017/0203805 A1    Jul. 20, 2017

(30) Foreign Application Priority Data
Jul. 15, 2014 (IT) .............................. RM2014A0386

(51) Int. Cl.
*B62J 27/00* (2006.01)
*B62J 17/04* (2006.01)

(52) U.S. Cl.
CPC ............... *B62J 27/00* (2013.01); *B62J 17/04* (2013.01); *B62K 2202/00* (2013.01)

(58) Field of Classification Search
CPC .................................. B62J 27/00; B62J 17/04
See application file for complete search history.

(56) References Cited

U.S. PATENT DOCUMENTS

| 4,087,110 A | 5/1978 | Vetter |
| 6,752,447 B2 | 6/2004 | Gagne |

(Continued)

FOREIGN PATENT DOCUMENTS

| EP | 0060807 | 9/1982 |
| EP | 2374700 A1 | 10/2011 |

(Continued)

OTHER PUBLICATIONS

International Search Report for PCT/IB2015/055319 dated Sep. 10, 2015.

(Continued)

*Primary Examiner* — D Glenn Dayoan
*Assistant Examiner* — Melissa A Black
(74) *Attorney, Agent, or Firm* — Cantor Colburn LLP

(57) ABSTRACT

A windscreen safety assembly comprising a windscreen panel (11), a support arm comprising a first part (12A) of arm for being attached to a vehicle, and a second part (13) of arm attached to the windscreen panel (11), at least one coupling element to rotatably couple the first and second part of arms (12A, 13) so that the second part of arm (13) is suitable to rotate around a rotation axis from a first angular position to a second angular position in a first direction and vice versa in a second direction, at least one blocking element to block the second part of arm (13) in the first angular position in a releasable manner, stop elements positioned between the first and second part of arms (12A, 13) to prevent the second part (13) of arm from rotating in the second direction starting from the first angular position.

17 Claims, 9 Drawing Sheets

(56) References Cited

U.S. PATENT DOCUMENTS

| | | |
|---|---|---|
| 8,469,624 B2 | 6/2013 | Carrabs et al. |
| 2011/0101724 A1 | 5/2011 | Wu |

FOREIGN PATENT DOCUMENTS

| | | |
|---|---|---|
| EP | 2374700 | 3/2013 |
| GB | 827330 A | 2/1960 |
| JP | 2009179262 | 8/2009 |
| JP | 2009179262 A | 8/2009 |

OTHER PUBLICATIONS

Italian Search Report for IT RM20140386 dated Nov. 6, 2014.
English translation of the Abstract for Application No. JP2009179262; 1 page; printed from Espacenet.com on Oct. 30, 2018.

WINDSCREEN SAFETY ASSEMBLY

CROSS-REFERENCE TO RELATED APPLICATION

This application is the 35 U.S.C. § 371 national stage application of PCT Application No. PCT/IB2015/055319, filed Jul. 14, 2015, where the PCT claims priority to and the benefit of, IT Patent Application No. RM2014A000386, filed Jul. 15, 2014, both of which are herein incorporated by reference in their entirety.

This description relates to the technical field of windscreen assemblies for vehicles and more preferably for motor vehicles. More particularly, this description relates to a windscreen safety assembly.

It is known to equip a scooter or a similar type of motor vehicle with a windscreen panel having the main function of making driving the vehicle more comfortable by shielding the driver from wind, rain and other elements that may negatively affect driving comfort. In particular it is known to fix the windscreen panel to the vehicle by means of a pair of support arms that are typically fixed to both handlebar of the vehicle and to the windscreen panel.

In the case in which the vehicle stops suddenly, for example in case of a road accident, and the driver is thrown forward towards the windscreen panel, he could be injured by hitting the windscreen panel and/or the associated support arms. For example, it may happen that the driver of the vehicle remains skewered in the support arms of the windscreen or is cut by partially breaking the windscreen panel following the impact with the windscreen panel itself. Furthermore, the Applicant has observed that the impact of the driver thrown from the vehicle with the windscreen panel and/or with the associated support arms may reduce the effectiveness of accessory safety devices for example a specific airbag for motorcyclists, for example an airbag for motorcyclists integrated into an airbag jacket, with which the driver may be equipped. In particular, the Applicant has noted that the effectiveness of an airbag for motorcyclists may also be significantly compromised if the driver, thrown from the vehicle, falls to the ground along a trajectory of fall that is not adequate due to the impact with parts of the windscreen panel and/or with the associated support arms.

To reduce the risk and extent of physical injury to the driver in situations of the type described above, various types of solutions have been proposed that provide for a forward tilting of the windscreen panel when it is struck by the driver thrown forward from the vehicle in direction of travel.

The European patent application published as number EP 0060807 in the name of Willey, Barry A., describes a windscreen assembly according to the preamble of claim 1. In particular, this patent application describes a windscreen safety assembly for a motorcycle in which the windscreen panel, following the impact with the driver thrown from the vehicle, tilts forward detaching itself from a pair of upper support arms. To avoid that the windscreen panel detaches completely from the motorcycle, a pair of lower support is also provided arms to which the windscreen remains connected. The windscreen assembly described in that document has a relatively complex structure for the fact of providing upper support arms, lower support arms and relatively complex fastening systems for fixing said arms to the windscreen panel. Furthermore, after the forward tilting of the windscreen panel, the driver can hit the upper support arms which, as discussed above, may reduce the effectiveness of the accessory safety devices with which the driver of the vehicle may be equipped.

In the solution described in the above-cited document, the windscreen panel can also hit the fork of the motorcycle causing, for example, damage to the windscreen panel.

The United States patent published as number U.S. Pat. No. 4,087,110 in the name of Vetter Design Works, Inc., describes a windscreen assembly solution for a motorcycle wherein the windscreen panel is constrained to the fairing of the motorcycle. This solution is not applicable to a windscreen assembly wherein the windscreen panel is fixed to the motorcycle by means of support arms.

A windscreen assembly solution that also provides, for reasons of transport rather than safety, the possibility of also tilting the windscreen panel forwards, is described in the United States patent published as number U.S. Pat. No. 6,752,447 in the name of Bombardier Recreational Products Inc. This document describes a solution wherein the windscreen panel is mounted on a so-called All-Terrain Vehicle (ATV) through the interposition of a pair of toothed washers that allow a clicking rotation of the windscreen panel in a single direction. This solution is not suitable to be employed as a windscreen safety assembly because the clicking movement of the windscreen panel increases the probability that the driver thrown from the vehicle can be injured by hitting the windscreen panel. Moreover, due to the discontinuous rotation of the windscreen that has a negative impact on the trajectory of fall, such a solution may, as discussed above, reduce the effectiveness of the accessory safety devices accessories with which the driver of the vehicle may be equipped. This document is also describes alternative embodiments that provide, for example, for the use of quick-release bolts of a type similar to those used to release the wheels of a bicycle. In this case, the windscreen panel can rotate forwards as well as backwards, thereby increasing the risk of physical injury to the driver thrown from the vehicle. Moreover, this solution provides that the quick-release bolt could break down when a predetermined rotational force is exceeded. In such a case, it is then necessary to replace the quick-release bolt in order to use the windscreen assembly again.

The United States patent application published as number US 2011/101724 describes a windscreen assembly solution wherein the height and inclination of the windscreen panel can be adjusted in such a way as to obtain the desired shielding effect. This windscreen assembly is not suitable to be used as windscreen safety assembly because, for example, the backwards rotation of the windscreen panel increases the risk of physical injury to the driver thrown from the vehicle, who can be injured by the upper edge of the windscreen panel.

The Japanese patent application published as number JP 2009 179262 and the European patent application published as number EP 2374700 describes further types of windscreen assemblies that are not suitable to be used as windscreen safety assemblies and that have, for example, the drawback described above with reference to patent application US 2011/101724.

A general purpose of this description is to make available an alternative windscreen safety assembly that is able to solve or reduce, at least partly, the drawbacks described above with reference to the known art.

This and other purposes are achieved through a windscreen safety assembly as defined in claim 1 in its most general form, and in the dependent claims in several particular embodiments.

This invention also covers a vehicle as defined in claim 15.

The invention will be better understood from the following detailed description of its embodiments, provided by way of example and therefore in no way limiting, in relation to the accompanying drawings, wherein.

Figure 1:
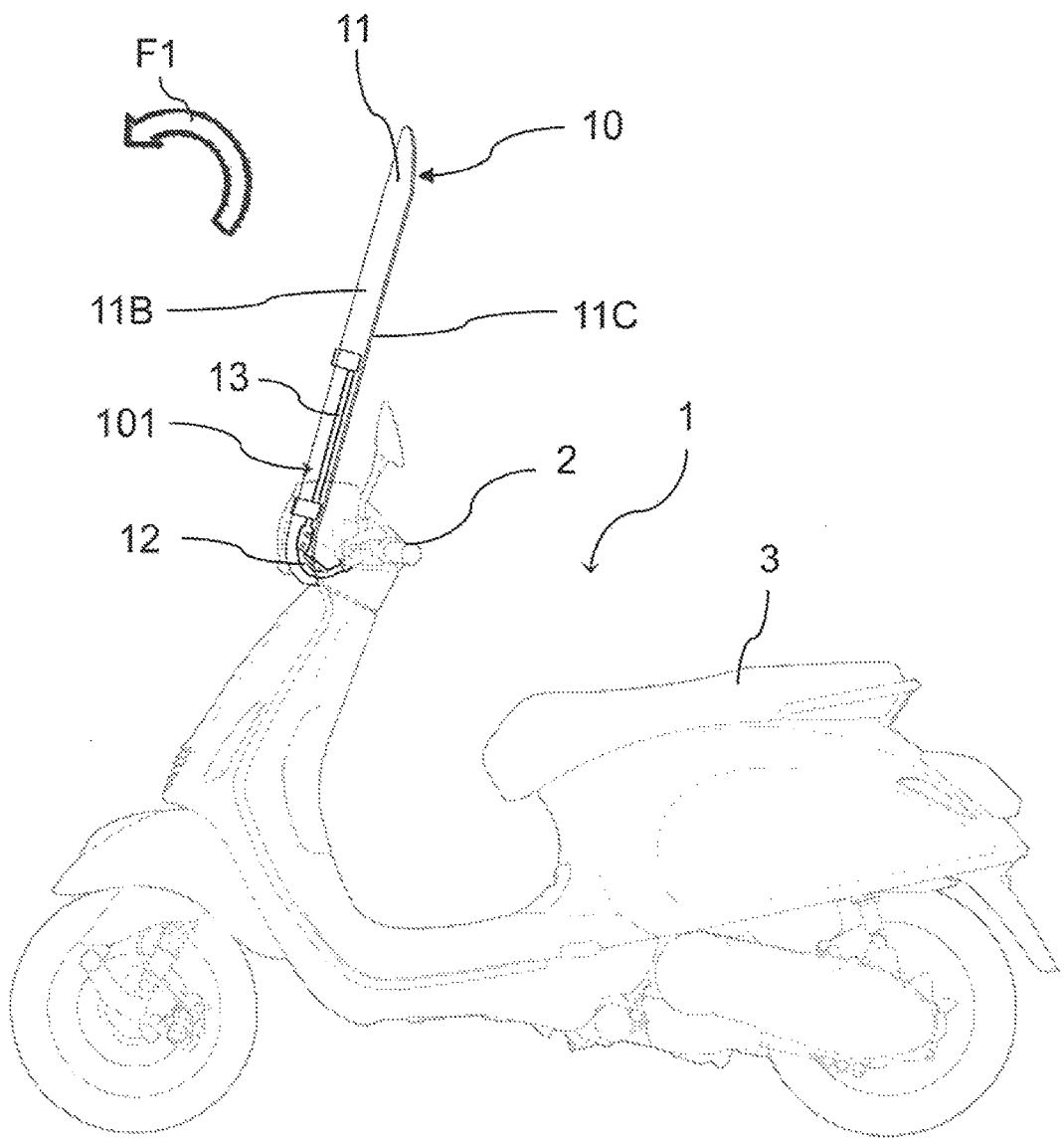
FIG. 1 is a three dimensional view, almost a side view, of a scooter equipped with a windscreen safety assembly according to a currently preferred embodiment, this windscreen assembly being shown in a first configuration.
Figure 2:
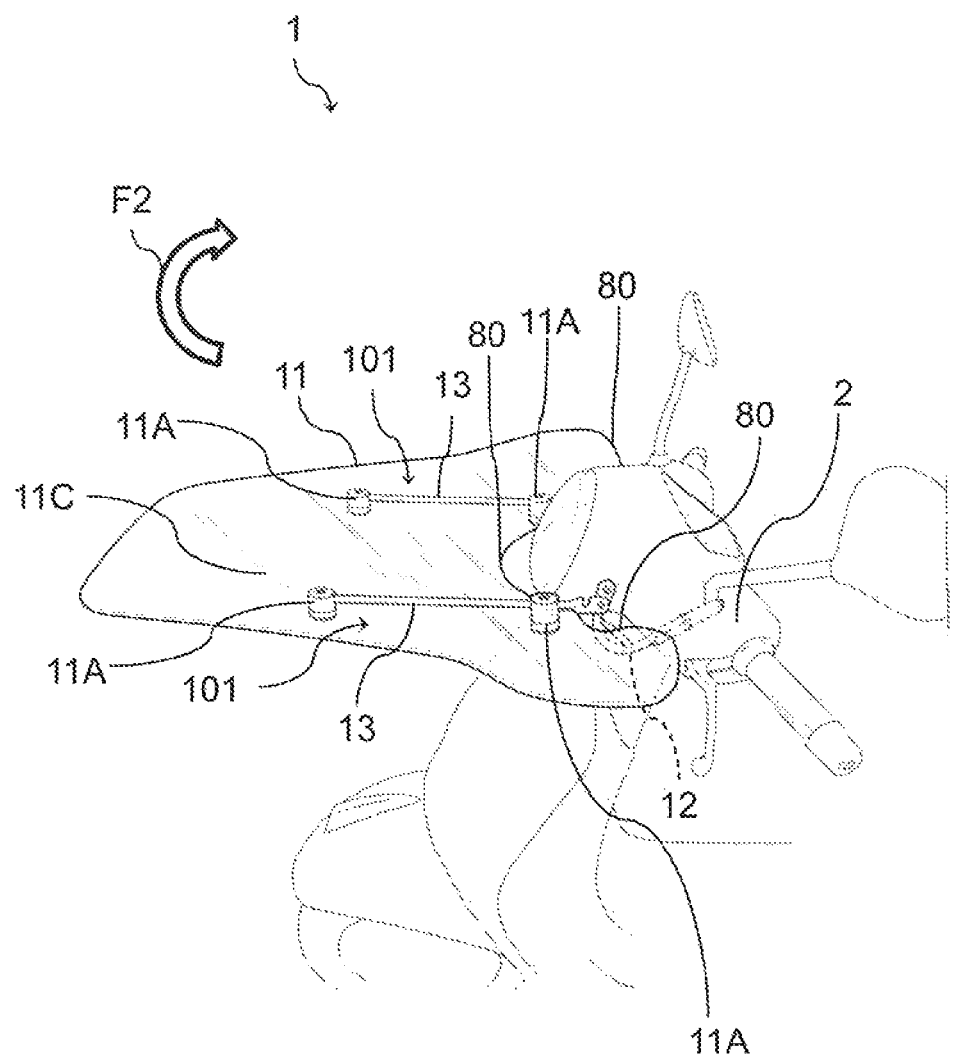
FIG. 2 is a partial three-dimensional view of the scooter of FIG. 1, in which the windscreen assembly of FIG. 1 is shown in a second configuration.
Figure 3:
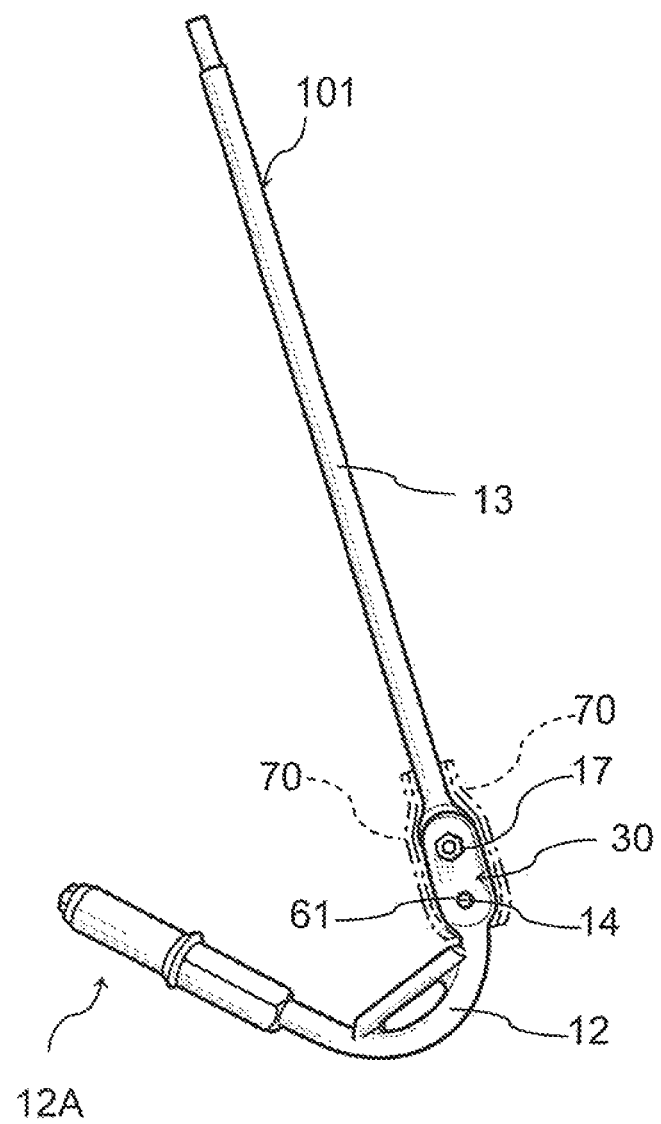
FIG. 3 is a three dimensional view, almost a side view, of a support arm of the windscreen assembly of FIG. 1, in which a component associable to this support arm is represented with dashed lines, and in which the support arm is shown in a configuration corresponding to the first configuration of the windscreen assembly shown in FIG. 1.
Figure 4:
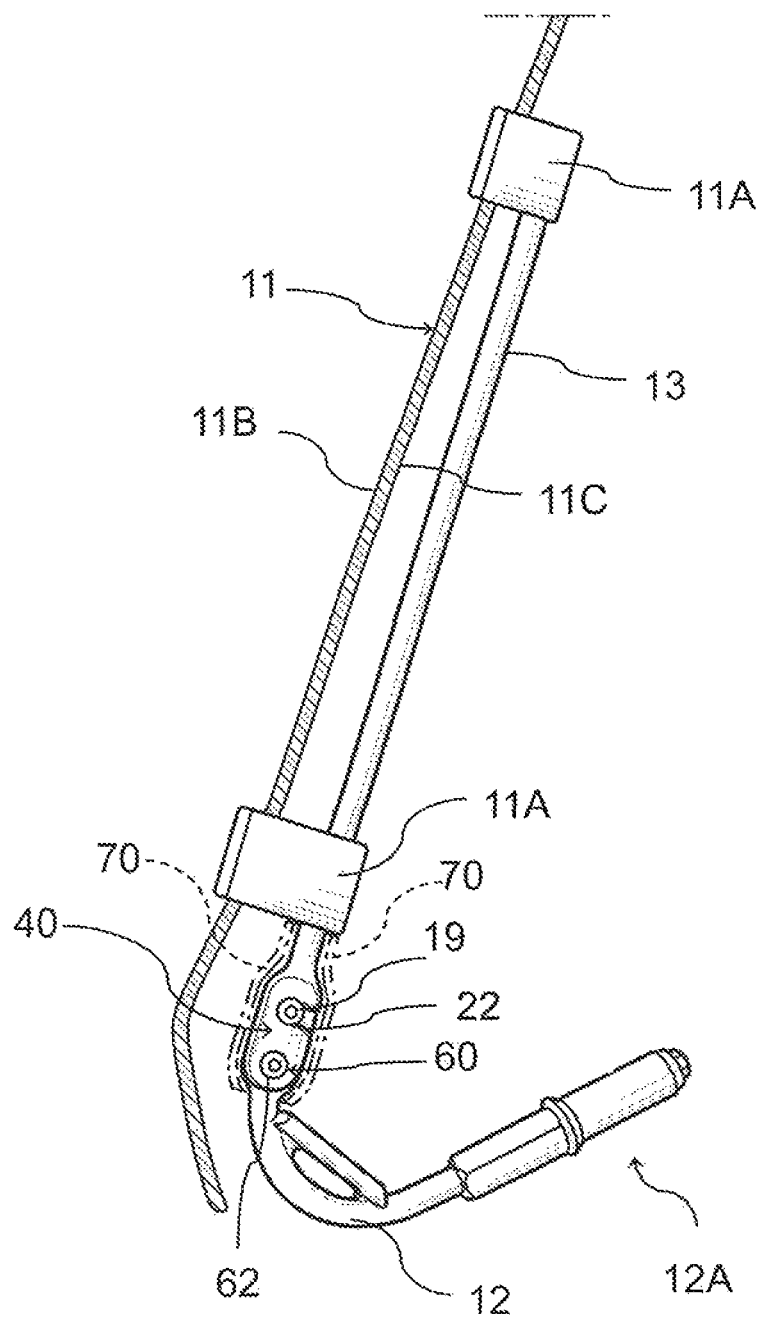
FIG. 4 is a three dimensional view, almost a side view, that shows the support arm and the component associable to the support arm of FIG. 3, in which the support arm is seen from the opposite side with respect to FIG. 3, which shows, partially and in section, a windscreen panel of the windscreen assembly of FIG. 1 fixed to the support arm.
Figure 5:
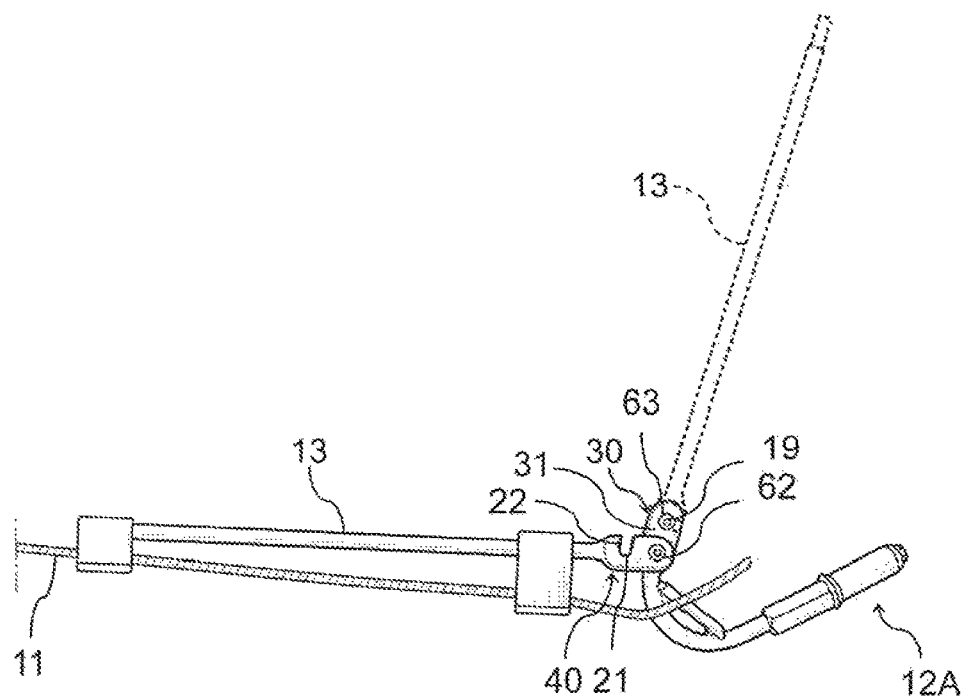
Figure 6:
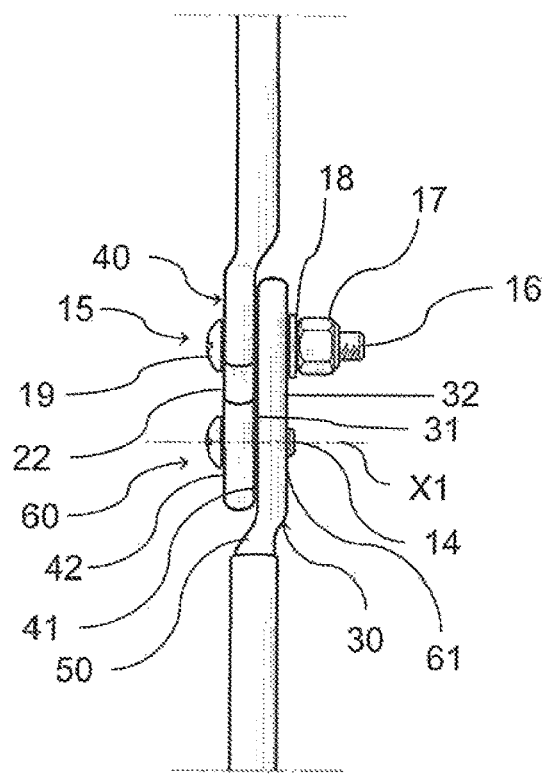
Figure 7:
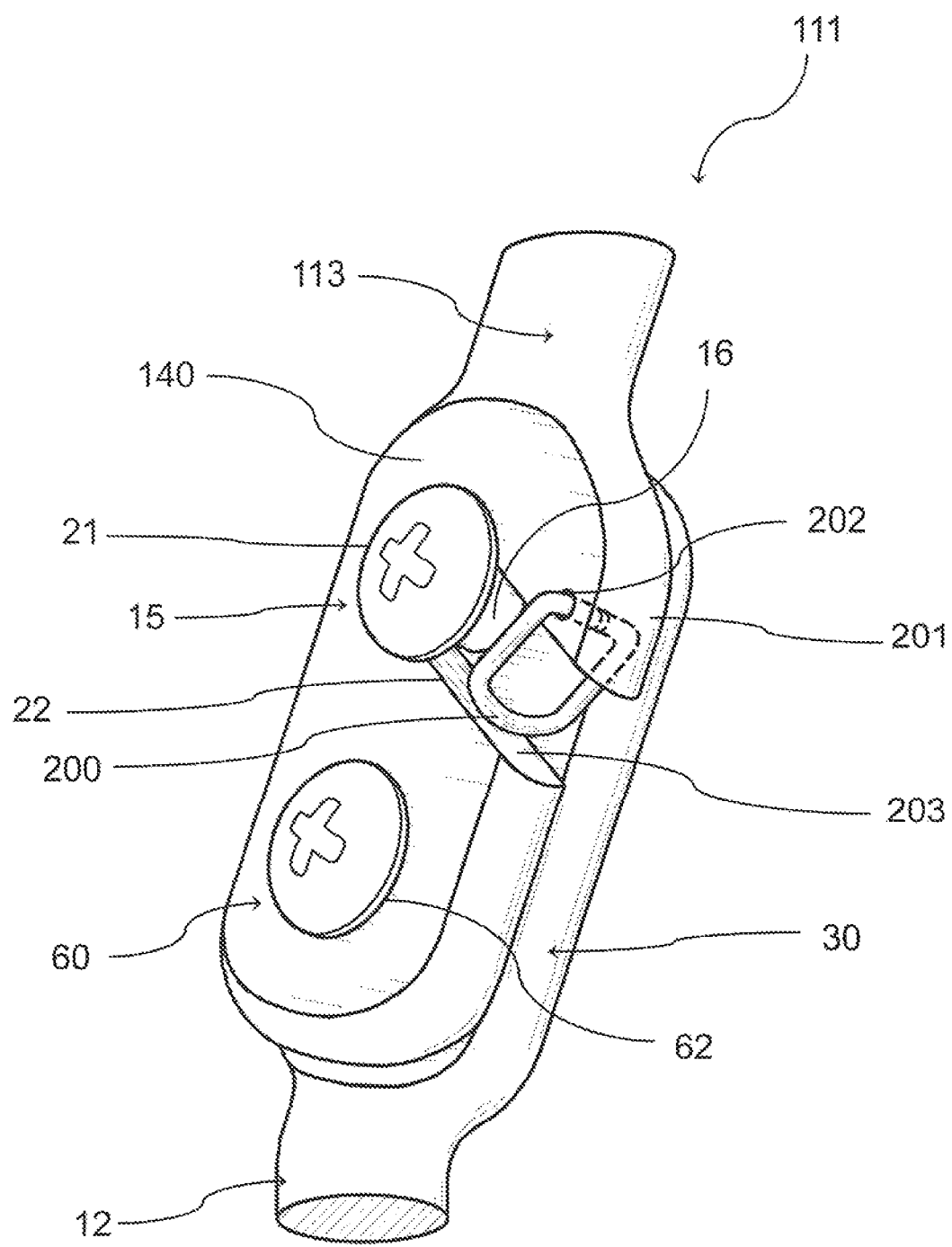
Figure 8:
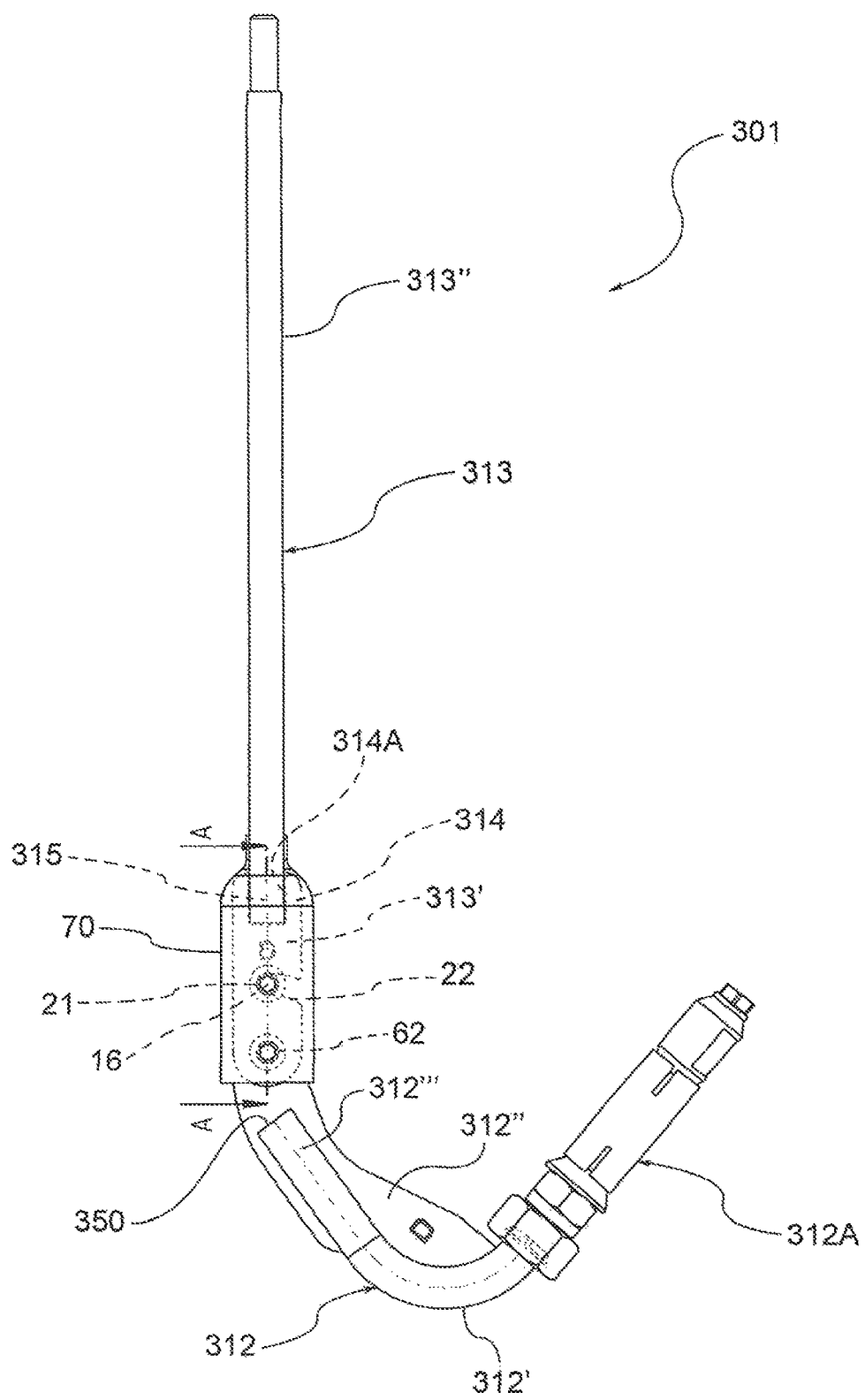
Figure 9:
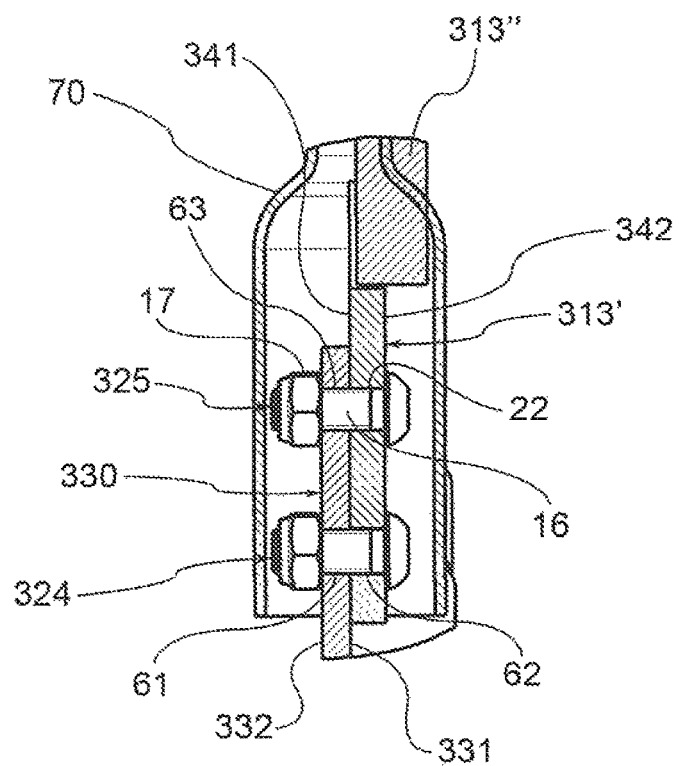
Figure 10:
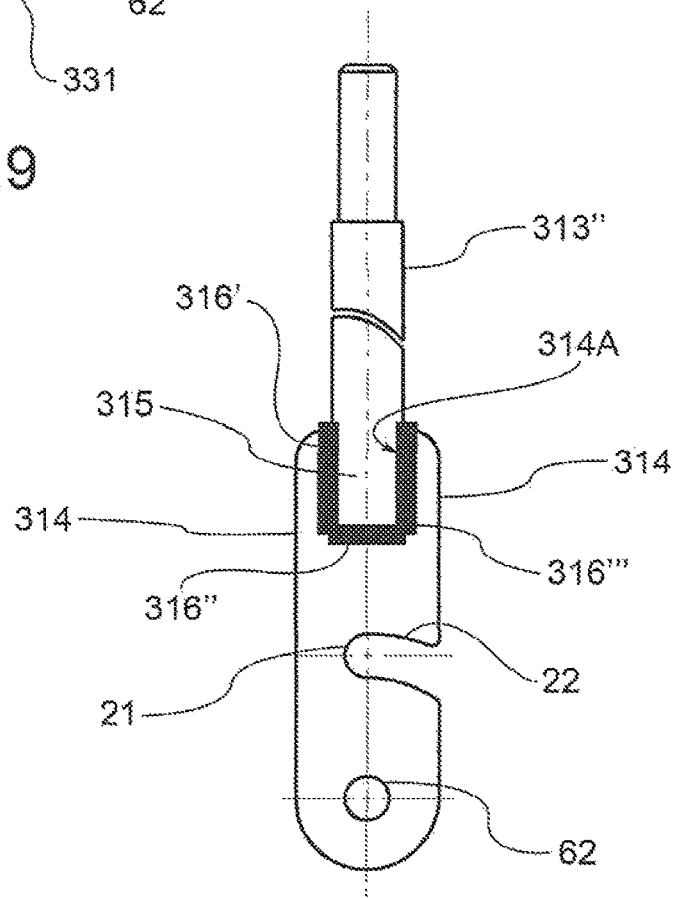
Figure 11:
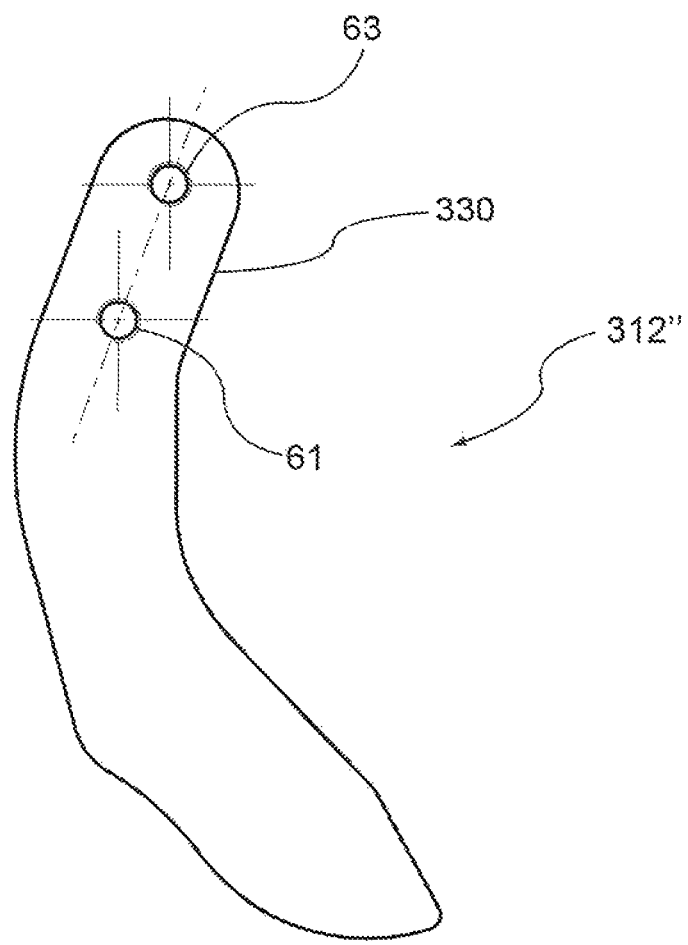

FIG. 5 is a three dimensional view, almost a side view, of the members shown in FIG. 4, in which the component associable to the support arm and shown with a dashed line in FIG. 4, is not shown, and in which the support arm is shown, respectively, with a continuous line in a configuration corresponding to the second configuration of windscreen assembly shown in FIG. 2 and, with a dashed line, in the configuration corresponding to the first configuration of the windscreen assembly shown in FIG. 1;

FIG. 6 is a partial rear view of the support arm of FIG. 3, in which the component represented by a dashed line in that figure is not shown;

FIG. 7 is a perspective view that shows a part of a windscreen safety assembly according to this description, according to a variant embodiment of this windscreen assembly;

FIG. 8 is a side plane view showing a support arm of a windscreen safety assembly according to this description, according to a variant embodiment of this windscreen assembly;

FIG. 9 is a front plan view in cross-section of a portion of the support arm of FIG. 8 along the line A-A of FIG. 8;

FIG. 10 is a side plan view of a part of the support arm of FIG. 8;

FIG. 11 is a side plan view of a part of the support arm of FIG. 8.

In the annexed figures, equal or similar elements will be indicated by the same reference numbers.

With reference to FIGS. 1 and 2, a scooter is shown that is globally indicated by the reference number 1. The scooter 1 is provided with a windscreen safety assembly according to a currently preferred embodiment, which is globally indicated by the reference number 10.

With reference to the accompanying figures, the windscreen safety assembly 10 comprises a windscreen panel 11 and at least one support arm 101 to support the windscreen panel 11. The windscreen panel 11 is a transparent panel that allows the driver of the scooter 1 to see through the panel 11. Preferably, the windscreen panel 11 is a curved panel, for example made from polymethylmethacrylate or polycarbonate and, more conveniently, from sheet polymethacrylate or polycarbonate, instead of being made for example of cast polymethacrylate or polycarbonate. In the example, the windscreen assembly 10 preferably comprises two support arms 101. In the example, the support arms 101 are substantially equal to each other, in the sense that when such arms 101 are fixed to the windscreen panel 11 in a normal condition of use, they have a symmetrical structure with respect to an axis of symmetry of the windscreen panel 11. Moreover, the support arms 101 have an identical function. In general, the windscreen assembly 10 may also comprise a pair of support arms 101 exactly identical to each other.

In a manner, known in itself, the support arms 101 allow supporting the windscreen panel 11 when the windscreen assembly 10 is mounted on the scooter 1. In this regard, note that although the vehicle shown in the figures is a scooter, the teachings of this description are not limited to this type of vehicle. In general, the teachings of this description may be extended to a windscreen safety assembly applicable to other similar types of vehicles that are provided with a steering handlebar and a seat astride which the driver of the vehicle can sit. Preferably the teachings of this description may be extended to windscreen safety assemblies applicable to road vehicles of such a type having two or more wheels, and more preferably having two, three or four wheels. In general the teachings of this description may, in any case, be extended to, for example, windscreen safety assemblies applicable to vehicles such as bicycles, motorcycles, scooters, trikes, ATVs (quadricycles/tricycles), jet skis, snowmobiles, etc., with any type of drive, by way of non-limiting example, with internal combustion engine, electric or hybrid drive.

In the example, the support arms 101 are spaced apart when the windscreen assembly 10 is mounted on the scooter 1. Since, as discussed above, in the example the windscreen assembly 10 comprises two support arms 101 substantially identical to each other, below, the structure of only one of the support arms 101 will be described in detail.

With reference to the accompanying figures, the support arm 101 comprises a first part 12 of arm, having by way of non-limiting example, a generally hook-shaped conformation, which is configured to be fixed to the scooter 1. The support arm 101 also comprises a second part 13 of arm, for example shaped generally as a straight rod, which is fixed or fixable to the windscreen panel 11. Preferably, the first part 12 of arm comprises at least one fixing member 12A for removably fixing the support arm 101 to the scooter 1 and, more preferably, to the handlebar 2 of such scooter. Preferably, the at least one fixing member 12A comprises a plurality of fixing members that are part of a fastening device that allows fixing the arm 101 to the handlebar of the scooter 1. For example, the arm 101 is fixed to the handlebar of the scooter 1 by means of a fixing device as described in U.S. Pat. No. 8,469,624 published in the name of the Applicant. In such a case, the above plurality of fixing members of the first part 12 of arm preferably comprises the elements shown in FIG. 2 of that patent.

The second part 13 of arm is fixed to the windscreen panel 11. Preferably, the second part 13 of arm is fixed to the windscreen panel in a removable manner, for example by means of one or more anchor blocks 11A integral with the windscreen panel 11. Each anchor block 11A has a through opening through which is inserted the second part 13 of arm, and a locking system configured to lock in a removable manner the second part 13 of arm once the latter has been inserted into the through opening. In this way, it is possible to make the second part 13 of arm integral with the anchor block 11A and consequently with the windscreen panel 11. The anchor blocks 11A are known, in themselves, and will therefore not be described in further detail. In the example the second part 13 of arm of each of the support arms 101 is fixed to two anchor blocks 11A.

With reference for example to FIG. 6, the windscreen assembly 10 comprises at least one coupling element 14 provided for coupling, in a rotatable manner, the second part 13 of arm to the first part 12 of arm in such a way that the second part 13 of arm is suitable to rotate about a rotation axis X1 from a first angular position (for example, FIG. 1, FIG. 4 and representation with dashed lines of FIG. 5) to a second angular position (FIG. 2 and continuous-line representation of FIG. 5) in a first direction F1. Furthermore, the at least one coupling element 14 allows the second part 13 of arm to rotate from the second angular position towards the first angular position and, more preferably, from the second angular position to the first angular position, in a second direction F2 opposite to the first direction F1. The first and the second angular position are mutually distinct angular positions and, more preferably, are distinct and predetermined angular positions. According to a preferred embodiment, the second part 13 of arm rotates by an angle generally comprised between about 100° and about 110° when it passes from the first angular position to the second angular position. In general, considering the windscreen assembly 10 mounted on the scooter 1 in a normal condition of use, in the first angular position, the second part 13 of arm is preferably substantially vertical while, in the second angular position, the second part 13 of arm is preferably horizontal or substantially horizontal. Always considering the windscreen safety assembly 10 mounted on the scooter 1 in a normal condition of use and with reference to the normal direction of travel of the scooter 1, the directions of rotation F1 and F2 correspond, in practice, respectively to a forward rotation and a backward rotation of the second part 13 of arm and, consequently, of the windscreen panel 11 integral with it. In other words, the windscreen panel 11 comprises a first face 11B of the windscreen panel and an opposite second face 11C of the windscreen panel that is intended to face the driver of the scooter 1. In other words, the second face 11C is intended to face the seat 3 of the scooter 1. The directions of rotation F1 and F2 correspond respectively to a rotation in the direction that goes from the second face 11C to the first face 11B and to a rotation in the direction that goes from the first face 11B towards the second face 11C. Still in other words, considering the windscreen assembly 10 mounted on the scooter 1 in a normal condition of use, the directions of rotation F1 and F2 correspond respectively to a rotation in the direction of moving away from the seat 3 of the scooter 1 and a rotation in the direction of approaching the seat 3. Still in other words, as can be seen in the accompanying figures, considering the windscreen assembly 10 mounted on the scooter 1 in a normal condition of use, the directions of rotation F1 and F2 correspond respectively to a rotation forwards and downwards and to a rotation backwards and upwards of the second part 13 of arm and, consequently, of the windscreen panel 11 integral with it. Still in other words, as can be seen in the accompanying figures, considering the windscreen assembly 10 mounted on the scooter 1 in a normal condition of use, the directions of rotation F1 and F2 correspond respectively to a rotation forwards and downwards and to a rotation backwards and upwards of an end portion of the second part 13 of arm that is opposite a second connection portion 40 of such part 13 of arm.

Note that, according to a preferred embodiment, the windscreen panel 11 has an edge 80 of panel (FIG. 2) shaped in such a way as to avoid that, when the windscreen assembly 10 is mounted on the scooter 1, the windscreen panel 11 interferes with a part of the scooter and/or with the first part 12 of arm during the rotation of the windscreen panel 11 in directions F1 and F2.

According to a preferred embodiment, the at least one coupling element 14 is, for example, a threaded body 14 of a coupling screw 60. Preferably, the body 14 of the screw 60 is screwed into a threaded hole 61 (FIG. 3) provided on a first connection portion 30 of the first part 12 of arm after being inserted through a smooth hole 62, or non-threaded hole 62 (FIG. 5) provided on a second connection portion 40 of the second part 13 of arm. In this regard, that it is preferable but not strictly indispensable that the at least one coupling element 14 include the threaded body 14 of the coupling screw 60. In general, the at least one coupling element may also include a coupling element of a different type that is suitable to rotatably couple the second part 13 of arm to the first part 12 of arm. In general, it is preferable that the at least one coupling element 14 include a rotation pin 14, which may be threaded or non-threaded. For example, according to an alternative embodiment, the at least one coupling element 14 may comprise a rivet (not shown) in place of the threaded body 14 of the coupling screw 60. In such a case, the holes 61, 62 will preferably both be non-threaded holes.

According to a preferred embodiment, the connection portions 30 and 40 are end portions of, respectively, the first and second parts of arm 12, 13.

The windscreen safety assembly 10 comprises at least one blocking element 15, or at least one blocking device 15, provided to block the second part of arm 13 in the first angular position in a releasable manner. As can be seen in the accompanying figures, the support arm 101 comprises the at least one blocking element 15. According to a preferred embodiment, the at least one blocking element 15 is suitable to block the second part 13 of arm by tightening or compressing between them the first and second connection portion 30, 40. According to a preferred embodiment, the at least one blocking element 15 is suitable to release the second part 13 of arm following the impact of the windscreen assembly 10 with a predetermined force of impact so as to allow a rotation of the second part 13 of arm towards the second angular position. Note that when the second part 13 of arm is in the first angular position and is blocked by means of the at least one blocking element 15, the windscreen assembly 10 is in an operative configuration. Conversely, when the second part 13 of arm assumes the second angular position, the windscreen assembly 10 is in a non-operative configuration. According to a preferred embodiment, the at least one blocking element 15 comprises a blocking bolt 15. The blocking bolt 15 comprises a blocking screw 19 and a blocking nut 17. In this case, to block the second part 13 of arm, it is convenient to tighten the blocking nut 17 with a tightening torque generally between 20 kNm and 30 kNm. The blocking screw 19 comprises a threaded screw body 16. Preferably, the blocking bolt 15 also comprises a split washer 18, or spring washer 18, interposed between the blocking nut 17 and the first connection portion 30. Alternatively, in place of the split washer 18, a different elastic element 18 may be provided such as, for example, a helical spring or a disc spring interposed between the blocking nut 17 and the first connection portion 30. As shown in FIG. 6, in the first angular position of the second part 13 of arm, the blocking bolt passes through the connecting portions 30, 40. More preferably, the blocking screw 19 is screwed into a threaded hole 63 (FIG. 5) provided in the first part 12 of arm. Furthermore, when the blocking bolt 15 blocks the second part 13 of arm in the first angular position, the body 16 of the blocking screw 19 is received in a recess 22 provided in the second part 13 of arm.

The windscreen safety assembly 10 comprises stop elements 16, 21 operatively interposed between the first and the second part of arm 12, 13 to prevent the second part 13 of arm to rotate in the second direction F2 from the first angular position. The stop elements 16, 21 are distinct from the at least one coupling element 14 and spaced from said element 14.

According to a preferred embodiment, the stop elements 16, 21 comprise the threaded screw body 16 of the screw 19 and an abutment portion 21 defined in the second part 13 of arm. The threaded screw body 16 protrudes from the first part 12 of arm transversely to the first and second part of arm 12, 13. The abutment portion 21 is suitable to cooperate with the body 16 of the screw 19. The second connection portion 40 in which is defined the abutment portion 21 also defines the above-mentioned recess 22. Preferably, as shown for example in FIG. 5, this recess 22 is partly delimited by the abutment portion 21 and has an open side opposite to the abutment portion 21. In the example, as shown in the figures, the recess 22 is more preferably an elongated slot 22 having an open side opposite to the abutment portion 21. Preferably, the second connection portion 40 has a generally "6" or "9" shape such as to define the recess 22 and the hole 62 for the rotation pin 14. When the second part 13 of arm is in the first angular position, the threaded screw body 16 is suitable to be received in the recess 22. In addition, the screw threaded body 16 is suitable to exit from the open side of the recess 22 when the second part 13 of arm rotates towards the second angular position.

According to a preferred embodiment, the first and second connection portion 30, 40 respectively comprise a first and a second flat or substantially flat connection side 31, 41. In this regard, note that, for the purposes of this description, the expression "flat or substantially flat" used to describe the connection sides 31, 41, means that such connection sides can be either flat sides substantially smooth or sides provided with one of more friction elements suitable to increase the friction between the connection sides 31, 41 when the second part 13 of arm is blocked in the first angular position. For example one or both connection sides 31, 41 can be knurled sides. In any case, the connection sides 31, 41 must be configured so as to be able to slide over one another when the second part 13 of arm rotates from the first angular position towards the second angular position.

When the blocking bolt 15 blocks the second part 13 of arm in the first angular position the connection sides 31, 41 are mutually facing and in contact with each other. In the example, the threaded body 14 of the screw 60 passes through the first and second connection sides 31, 41. In addition, the threaded screw body 16 of the screw 19 protrudes from the connection side 31 of the first arm part 12.

According to a preferred embodiment, the connection portions 30, 40 are plate-shaped portions. Furthermore each of these connection portions 30, 40 preferably comprises a further flat or substantially flat side 32, 42 opposite with respect to the respective connection side 31, 41. In other words, the first connection portion 30 comprises a further flat or substantially flat side 32 that is opposite to the first connection side 31, while the second connection portion 40 comprises a further flat or substantially flat side 42 that is opposite to the second connection side 41.

According to a preferred embodiment, the connection portions 30, 40 are portions 30, 40 of reduced thickness. More preferably, as shown for example in FIG. 6, the connecting portions 30, 40 are portions of reduced thickness having a total thickness substantially corresponding to the average thickness of the support arm 101.

According to a preferred embodiment, the first connection portion 30 is shaped so as to define a limit stop shoulder 50 against which the second part 13 of arm abuts in the second angular position. Conveniently, the limit stop shoulder 50 prevents the windscreen panel 11 from undesirably interfering with one or more parts of the scooter 1, such as, for example, the front wheel or fork, when the support arm 101 assumes the second angular position.

Note that, in the case in which the connection portions 30, 40 are portions of reduced thickness, it is conveniently possible to realise the shoulder 50 maintaining a relatively pleasant aesthetic appearance of the support arm 101 since, in this way, the first and the second part of arm 12, 13 may be connected together in a relatively gradual way.

According to a preferred embodiment, the windscreen safety assembly 10 may comprise a protective sleeve 70 (represented by dashed lines for example in FIG. 3), for example made of rubber or another plastic material, which is configured to be fitted around the first and second connection portion 30, 40 when the second part 13 of arm assumes the first angular position. The protective sleeve 70 is preferably an elastic sleeve and preferably has a thickness of a few millimeters, for example a thickness of about 1 mm. The protective sleeve 70 conveniently allows both providing a further aid in order to avoid an accidental disconnection of the screw 19 of the blocking bolt 15 from the recess 22 and to protect the blocking bolt 15 and the screw 60 for example from rust and dirt. In addition, the protective sleeve 70 allows improving the aesthetic appearance of the support arm 101 by covering the connection portions 30, 40.

Having described the structure of a windscreen safety assembly according to this description, we now describe an exemplifying and non-limiting method of use of such assembly with reference to the embodiment illustrated in the accompanying figures.

Consider the windscreen safety assembly 10 in the configuration of FIG. 1, in which the windscreen assembly 10 is mounted on a scooter 1, and where the second parts 13 of arm of the support arms 101 assume the first angular position. In this configuration, the blocking bolts 15 block the second parts 13 of arm in the first angular position and a rotation of the second parts 13 of arm in the direction of the arrow F2 is prevented by the bodies 16 of the screws 19 and the abutment portions 21 provided in the connection portions 40 of the support arms 101. Starting from this configuration, assuming that the second face 11C of windscreen panel of the windscreen panel 11 is struck by a predetermined impact force, the windscreen panel 11 will rotate together with the second parts 13 of arm of the arms 101 in the direction of the arrow F1. This can happen, for example, in the case where, for example, due to a road accident, the scooter driver 1 is thrown from the seat 3 against the windscreen assembly 10. The rotation of the windscreen panel 11 is made possible by the fact that the above-mentioned predetermined impact force allows a sliding of the recesses 22 with respect to the blocking bolts 15, thanks to which the second parts 13 of the support arms 101 are disengaged from the respective blocking bolts 15. In this regard, note that once the recesses 22 are disengaged from the blocking bolts 15, the second pieces 13 of arm can rotate freely with respect to the first parts 12 of arm. In practice, once disengaged from the blocking bolts 15, the second pieces 13 of arm can rotate freely until the second angular position in which the windscreen assembly 10 assumes the configuration of FIG. 2.

Starting from the configuration of FIG. 2, it is possible to again make the windscreen assembly 10 assume the configuration of FIG. 1 simply by manually rotating the second pieces 13 of arm in the direction of the arrow F2 until the second pieces 13 of arm assume the first angular position. For this purpose, it is preferable to at least partially unscrew the nuts 17 so as to facilitate the insertion of the screws 19 in the recesses 22 and then retighten the nuts 17 so as to block the second pieces 13 of arm in the first angular position.

Based on the above, it is therefore possible to understand how a windscreen safety assembly according to this description allows achieving the purposes mentioned above with reference to the state of the prior art.

It is evident that numerous modifications and/or variations may be made to a windscreen safety assembly according to this description.

For example, although in the embodiment of the windscreen assembly illustrated in the figures, the blocking bolt 15 performs both the function of blocking element of the second part 13 of arm and the function of stop element by means of the body 16 of the screw 19, in general these functions can also be realized through elements or devices distinct from each other. For example, according to a less preferred embodiment (not shown), in place of the blocking bolt 15, a blocking device can be provided applied externally to the connection portions 30, 40 to clamp between them these connection portions 30, 40 in the first angular position of the second part 13 of arm. This blocking device may, for example, include a blocking clamp of the known type which can be arranged astride the connection portions 30, 40, such as, for example, a blocking clamp comprising a threaded compression pin screwed on a substantially "C" or "U" shaped support. In this case, the stop elements 16, 21 will always comprise the body 16 of the screw 19 but the blocking nut 17 and the split washer 18 will not be required.

Also note that, in general, it is not strictly essential that the stop elements 16, 21 comprise the body 16 of the screw 19 rigidly connected to the first connection portion 30, and an abutment portion 21 provided in the second connection portion 40. In general, it is preferable that the stop elements 16, 21 comprise a stop pin 16, threaded or non-threaded, and an abutment portion 21 that is suitable to cooperate with the stop pin 16. According to an alternative embodiment, the screw 19, or more generally, a stop pin 16 may be rigidly connected to the second connection portion 40 instead of to the first connection portion 30, while the abutment portion 21 and the recess 22 may be provided in the first connection portion 30 instead of in the second connection portion 40. In this case, the abutment portion 21 will then be located on the opposite side with respect to the example embodiment illustrated in the accompanying figures, so as to allow a rotation of the second part 13 of arm in the direction of the arrow F1 from the first angular position. In practice, in the case in which the stop elements 16, 21 comprise a stop pin 16 and an abutment portion 21, it is sufficient, in general, that the stop elements 16, 21 comprise a stop pin 16 that extends transversely to the first and second part of arm 12, 13 and that is rigidly connected to one of the first and the second part of arm 12, 13, and an abutment portion 21, that is defined in the other of the first and second parts of arm 12, 13 and that is suitable to cooperate with the first stop pin 16. More preferably, the stop pin 16 is rigidly connected or made integral with one of the first and the second part of arm 12, 13 at one of the connection sides 31, 41. In this regard, note that the stop pin 16 can be, in general, rigidly connected or made integral with one of the first and the second arm parts 12, 13, for example and not limiting, by screwing or welding such pin to one of the said parts of arm 12, 13, or even by realizing the stop pin 16 in one piece with one of these parts of arm 12, 13. Note, moreover, that the expression "stop pin" must be understood in a relatively broad sense. For example, in the case in which a blocking element different than the blocking bolt 15 were used to block the second part 13 of arm in the first angular position, the stop pin 16 can also be a non-threaded or can, for example, also consist of a protrusion, for example, formed in one piece with one of the connection portions 30, 40, having a shape different from the cylindrical, or generally cylindrical shape of the screw body 16 of the screw 19. Furthermore, although in general the stop pin 16 is preferably an element having a predominantly longitudinal extension, this stop pin could also be a pin that does not have a predominantly longitudinal extension but that is still able to go into abutment with the abutment portion 21.

Note, again, that in general it is preferable but not strictly indispensable that the at least one blocking element 15 be suitable to block the second part 13 of arm by compressing between them the connection portions 30, 40. For example, according to a less preferred embodiment, the at least one blocking element may comprise a stop pin 16 coated for example with a rubber sleeve or with a suitable adhesive to cooperate with a part of the connection portion 30 or 40 that defines the recess 22, so as to block in a releasable manner by friction, mechanical interference or gluing the second part 13 of arm in the first angular position. According to a further embodiment, such rubber sleeve or adhesive can also be applied in addition to the blocking screw 19 of the blocking bolt 15.

Note, further, that in the case in which the recess 22 is provided in the first connection portion 30 instead of in the second connection portion 40, the first connection portion 30 may be generally "6" or "9" shaped. In general, the connection portion 30 or 40 that defines the recess 22 preferably has a generally "6" or "9" shape.

FIG. 7 is a perspective view that shows a part of a windscreen safety assembly according to this description, according to a variant embodiment of this windscreen assembly. In particular, the embodiment of FIG. 7 differs, for example, from the embodiment example of FIGS. 5 and 6 for the fact that it comprises an elastic safety element 200 coupled to a second connection portion 140 in which the recess 22 is defined. The second connection portion 140 belongs to a second part 113 of arm of a support arm 111 that corresponds to a variant embodiment of the support arm 101. The elastic safety element 200 is configured to act in conjunction with the stop pin 16 so as to keep the stop pin 16 in the recess 22 in a releasable manner when the second part 113 of arm assumes the first angular position. This ensures additional safety in order to avoid that, during a normal running condition of the scooter 1, or another vehicle to which the windscreen safety assembly is mounted, the windscreen safety panel undesirably assumes a non-operative configuration similar to the configuration of FIG. 2. This could happen, for example, if the nut 17 of the blocking bolt 15 accidentally loosens. Always with reference to FIG. 7, according to a preferred embodiment, the elastic safety element 200 comprises an elastic ring 200, such as, for example, a spring washer or another similar ring-shaped element. According to a preferred embodiment, the elastic ring 200 is an elongated ring. The elastic ring 200 is preferably rotatably coupled or hinged to a coupling portion 201 of the second connection portion 140. More preferably, the elastic ring 200 is inserted through a coupling hole 202 provided in the coupling portion 201. According to a preferred embodiment, the elastic ring 200 is suitable to assume a retention configuration (FIG. 7) and a release configuration (not shown). In the retention configuration, the ring 200 is preferably inclined towards the stop pin 16 and rests on a wall 203 delimiting the recess 22. When, starting from the first angular position, the second part 113 of arm rotates towards the second angular position, for example due to the impact of the windscreen safety assembly with the above-mentioned predetermined impact force, the stop pin 16 elastically deforms the elastic ring 200 which in turn rotates until it snaps crossing the open side of the recess 22.

Note that, in the example, the connection portion 140 differs from the second connection portion 40 shown for example in FIG. 5 or 6, only for the fact of providing the coupling portion 201 and the coupling hole 202. For the rest, the second part 113 of arm of FIG. 7 is identical to the second part 13 of arm shown for example in FIG. 5.

Note, also, that, according to a less preferred embodiment not illustrated, the open side of the recess 22 can also be closed partially or completely by at least one compliant element that is suitable to break when the windscreen panel is struck with a predetermined impact force so as to allow the rotation of the second part 13 of arm with respect to the first part 12 of arm.

FIG. 8 shows a further convenient embodiment of a support arm 301 for a windscreen safety assembly according to this description. As in the case of the arms 101 described above, a windscreen safety assembly according to this description in accordance with this embodiment preferably comprises a pair of support arms 301, which are preferably substantially equal to each other, in the sense that when these arms 101 are fixed to the windscreen panel 11 in a normal condition of use, they have a symmetrical structure with respect to an axis of symmetry of the windscreen panel 11. The support arm 301 works in an identical or substantially identical way to the support arm 101 described above. The support arm 301 comprises a first part 312 of arm configured to be fixed or fixable to the vehicle 1 and a second part 313 of arm fixed, or fixable, to the windscreen panel 11. According to a preferred embodiment, the first part 312 of arm 301 comprises a first sub-portion 312', preferably having at least partially the shape of a bent rod, and a second sub-portion 312". Preferably, the first sub-portion 312' comprises at least one fixing member 312A for removably fixing the support arm 301 to the scooter 1. According to a preferred embodiment, the second sub-portion 312" of the first part 312 of arm comprises a stiffening plate 312" which is fixed to a side wall 312''', and more preferably welded laterally to the side wall 312''', of the first sub-portion 312'. For example, the side wall 312''' is a cylindrical, or generally cylindrical, wall. With reference to FIG. 11, the stiffening plate 312" comprises a first connection portion 330. The first connection portion 330 is preferably an end portion of the first part 312 of arm. In general, the first connection portion 330 is functionally identical, or functionally substantially identical, to the first connection portion 30 described above with reference to the first part 12 of arm of the support arm 101 of FIG. 3. For example, according to a preferred embodiment, the first connection portion 330 comprises the threaded hole 61 and the threaded hole 63. In the example of FIGS. 8, 9 11, apart from the fact that the first connection portion 330 is a portion of the stiffening plate 312', the first connection portion 330 is identical, or substantially identical, to the first connection portion 30 described above. For example, the first connection portion 330 may include a first flat, or substantially flat, connection side 331 similar to the side 31 and, preferably, a further side 332, flat or substantially flat, similar to the side 32 that is opposite with respect to the connection side 331. More generally, what is described above with reference to the first connection portion 30, and related embodiment variants, is also valid in the case of the first connection portion 330, to the extent compatible with such an embodiment wherein the stiffening plate 312' includes the connection portion 330. For this reason, the first connection portion 330 will not be described in further detail.

With reference to FIG. 8, according to a preferred embodiment, the second part 313 of the arm 301 comprises a first sub-portion 313' and a second sub-portion 313". The first sub-portion 313' comprises a second connection portion 313'. The second sub-portion 313" is preferably shaped like a straight rod. Preferably, the second connection portion 313' is an end portion of the second part 313 of arm. The second connection portion 313' is functionally identical, or functionally substantially identical, to the second connection portion 40 described above with reference to the support arm 101. For example according to a preferred embodiment, the second connection portion 313' includes the slot 22 and the smooth hole 62 described above with reference to the second connection portion 40 (FIG. 4). As can be seen also in FIG. 10, the second connection portion 313' comprises a fixing portion 314, preferably a forked fixing portion 314, which defines a fixing recess 314A. With reference also to FIG. 10, the fixing recess 314A receives an end portion 315 of the second sub-portion 313" of the second arm part 313. The end portion 315 is fixed to the fixing portion 314, and, more preferably, is welded to that portion 314. More preferably, the end portion 315 is welded (the weld lines are represented with a thicker line in FIG. 10) to the fixing portion 314 along a plurality of contiguous welding sides 316', 316", 316''', preferably along three contiguous welding sides 316', 316", 316'''.

In the example illustrated in FIGS. 8 to 10, apart from the fact of comprising the above-mentioned fixing portion 314, the second connection portion 313' is identical, or substantially identical, to the second connection portion 40 described above (FIG. 5). For example, the first connection portion 330 may include a first flat, or substantially flat, connection side 341 similar to the side 41 and, preferably, a further side 342, flat or substantially flat, similar to the side 42 that is opposite with respect to the connection side 341. More generally, what is described above with reference to the second connection portion 40, and related embodiment variants, is also valid in the case of the second connection portion 313', to the extent compatible with such an embodiment wherein the above-mentioned fixing portion 314 is provided. For this reason, the second connection portion 313' will not be described in further detail.

With reference to FIGS. 8 and 9, the support arm 301 comprises at least one coupling element 324, at least one blocking element 325 and the above-mentioned stop elements 16, 21. In the example of FIGS. 8 and 9, the at least one coupling element 324 and the at least one blocking element 325 respectively comprise a coupling bolt 324 and a blocking bolt 325. According to an embodiment, the at least one coupling element 324 and the at least one blocking element 325 are identical respectively to the at least one coupling element 14 and the at least one blocking element 15 described above. In general, what is described above with reference to at least one coupling element 14, and related embodiment variants, is also valid in the case of the at least one coupling element 324. Moreover, in general, what is described above with reference to at least one blocking element 15, and related embodiment variants, is also valid in the case of the at least one blocking element 325. For this reason, the at least one coupling element 324 and the at least one blocking element 325 will not be described in further detail.

Always with reference to FIG. 8, note that, conveniently, the first sub-portion 312' is suitable to define a limit stop shoulder 350 against which abuts the second part 313 of arm in the second angular position, namely in the angular position corresponding to the angular position of the support arms 101 in FIG. 2.

With reference to FIGS. 8 and 9, according to a preferred embodiment, the windscreen safety assembly 10 may comprise a protective sleeve 70 described above, which is configured to be fitted around the first and second connection portion 330, 313' when the second part 313 of arm assumes the first angular position.

Note that the fact of providing the stiffening plate and the forked portion in which the sub-portion is fixed allows significantly reducing the probability that the support arms 301 of the windscreen assembly can break when the driver thrown from the vehicle collides with the windscreen assembly. In this way, a windscreen safety assembly according to this description is able to provide the driver significant safety while also reducing the risk of having to replace parts of the windscreen assembly following a road accident.

Without prejudice to the principle of the invention, the forms of embodiment and details of construction may be varied widely with respect to what has been described and illustrated purely by way of non-limiting example, without thereby departing from the invention as defined in the appended claims.

The invention claimed is:

1. A windscreen safety assembly comprising:
a windscreen panel;
a support arm to support the windscreen panel, the support arm comprising a first part of arm configured to be attached to a vehicle, and a second part of arm attached to the windscreen panel, the vehicle provided with a steering handlebar and a seat astride which a driver of the vehicle may sit;
at least one coupling element to rotatably couple the second part of arm to the first part of arm so that the second part of arm is suitable to rotate around a rotation axis from a first angular position to a second angular position in a first direction and from the second angular position toward the first angular position in a second direction opposite the first direction, the first and second angular positions being positions distinct from each other;
at least one blocking element provided to block the second part of arm in the first angular position in a releasable manner; and
stop elements operatively positioned between the first and the second part of arm to prevent the second part of arm from rotating in said second direction starting from the first angular position, the stop elements being distinct from the at least one coupling element and distanced from the at least one coupling element; and
wherein, considering the windscreen safety assembly mounted on the vehicle in a normal condition of use, in the first angular position, the second part of arm is substantially vertical, and in the second angular position, the second part of arm is substantially horizontal.

2. The windscreen safety assembly according to claim 1, wherein when the second part of arm is in the first angular position and is blocked by means of the at least one blocking element, the windscreen safety assembly is in an operative configuration, in which, when the second part of arm assumes the second angular position, the windscreen safety assembly is in a non-operative configuration, wherein the windscreen panel comprises a first face of the windscreen panel and an opposite second face of the windscreen panel that is intended to be facing the driver of the vehicle, wherein said rotations of the second part of arm in said first and said second direction respectively correspond to a rotation in a direction that goes from the second face of the windscreen panel to the first face of the windscreen panel and to a rotation in a direction that goes from the first face of the windscreen panel towards the second face of the windscreen panel.

3. The windscreen safety assembly according to claim 1, wherein said stop elements comprise a stop pin that extends transversely to the first and second part of arm and that is rigidly connected to one of the first and the second part of arm, and an abutment portion, suitable to cooperate with the stop pin, which is defined in the other of the first and second parts of arm.

4. The windscreen safety assembly according to claim 1, wherein the at least one blocking element is suitable to release the second part of arm following an impact of the windscreen safety assembly with a predetermined force of impact so as to allow a rotation of the second part of arm towards the second angular position.

5. The windscreen safety assembly according to claim 3, wherein said at least one coupling element comprises a rotation pin, wherein the first and the second part of arm respectively comprise a first and a second connection portion, the first and second connection portion respectively comprise a flat or substantially flat first and a second connection side mutually facing and in contact with each other when the at least one blocking element blocks the second part of arm in the first angular position, wherein said rotation pin crosses the first and the second connection side and wherein said stop pin is rigidly connected to one out of the first and the second part of arm at one of said connection sides.

6. The windscreen safety assembly according to claim 5, wherein the at least one blocking element comprises a blocking bolt comprising a blocking screw and a blocking nut, the blocking screw including said stop pin, the blocking bolt crossing said connection portions in the first angular position of the second part of arm.

7. The windscreen safety assembly according to claim 5, wherein said abutment portion is defined in one of said connection portions, the connection portion in which the abutment portion is defined also defining a recess delimited partially by said abutment portion and having an open side opposite said abutment portion, the stop pin being suitable to be received in the recess when the second part of arm is in the first angular position and to come out of the open side of the recess when the second part of arm rotates toward the second angular position.

8. The windscreen safety assembly according to claim 7, comprising an elastic safety element coupled to the connection portion in which said recess is defined, said elastic safety element being configured to act in conjunction with the stop pin so as to keep the stop pin in the recess in a releasable manner when the second part of arm assumes the first angular position.

9. The windscreen safety assembly according to claim 5, wherein said connection portions are plate-shaped portions, each of said connection portions comprising a further flat or substantially flat side opposite the respective connection side.

10. The windscreen safety assembly according to claim 5, wherein said connection portions are portions of reduced thickness.

11. The windscreen safety assembly according to claim 5, wherein the first connection portion is shaped so as to define a limit stop shoulder against which the second part of the arm abuts in the second angular position.

12. The windscreen safety assembly according to claim 7, wherein the connection portion defining said recess generally has a "6" or "9" shape.

13. A windscreen safety assembly comprising:
a windscreen panel;
a support arm to support the windscreen panel, the support arm comprising a first part of arm configured to be attached to a vehicle, and a second part of arm attached to the windscreen panel, the vehicle provided with a steering handlebar and a seat astride which a driver of the vehicle may sit;
at least one coupling element to rotatably couple the second part of arm to the first part of arm so that the second part of arm is suitable to rotate around a rotation axis from a first angular position to a second angular position in a first direction and from the second angular position toward the first angular position in a second direction opposite the first direction, the first and second angular positions being positions distinct from each other;
at least one blocking element provided to block the second part of arm in the first angular position in a releasable manner; and
stop elements operatively positioned between the first and the second part of arm to prevent the second part of arm from rotating in said second direction starting from the first angular position, the stop elements being distinct from the at least one coupling element and distanced from the at least one coupling element;
wherein the stop elements comprise a stop pin that extends transversely to the first and second part of arm and that is rigidly connected to one of the first and the second part of arm, and an abutment portion, suitable to cooperate with the stop pin, which is defined in the other of the first and second parts of arm;
wherein the at least one coupling element comprises a rotation pin, wherein the first and the second part of arm respectively comprise a first and a second connection portion, the first and second connection portion respectively comprise a flat or substantially flat first and a second connection side mutually facing and in contact with each other when the at least one blocking element blocks the second part of arm in the first angular position, wherein said rotation pin crosses the first and second connection side and wherein said stop pin is rigidly connected to one out of the first and the second part of arm at one of said connection sides; and
wherein the first part of arm and the second part of arm each comprise a first sub-portion and a second sub-portion, wherein the first sub-portion of the first part of arm comprises a side wall and wherein the second sub-portion of the first part of arm comprises a stiffening plate that comprises said first connection portion and that is fixed to the side wall of the first part of arm, wherein the first sub-portion of the second part of arm comprises said second connection portion and the second sub-portion of the second part of arm comprises an end portion, the second connection portion comprising a fixing portion to which is fixed the end portion of the second sub-portion of the second part of arm and which defines a fixing recess in which such end portion is received.

14. A windscreen safety assembly comprising:
a windscreen panel;
a support arm to support the windscreen panel, the support arm comprising a first part of arm configured to be attached to a vehicle, and a second part of arm attached to the windscreen panel, the vehicle provided with a steering handlebar and a seat astride which a driver of the vehicle may sit;
at least one coupling element to rotatably couple the second part of arm to the first part of arm so that the second part of arm is suitable to rotate around a rotation axis from a first angular position to a second angular position in a first direction and from the second angular position toward the first angular position in a second direction opposite the first direction, the first and second angular positions being positions distinct from each other;
at least one blocking element provided to block the second part of arm in the first angular position in a releasable manner; and
stop elements operatively positioned between the first and the second part of arm to prevent the second part of arm from rotating in said second direction starting from the first angular position, the stop elements being distinct from the at least one coupling element and distanced from the at least one coupling element;
wherein the stop elements comprise a stop pin that extends transversely to the first and second part of arm and that is rigidly connected to one of the first and the second part of arm, and an abutment portion, suitable to cooperate with the stop pin, which is defined in the other of the first and second parts of arm;
wherein the at least one coupling element comprises a rotation pin, wherein the first and the second part of arm respectively comprise a first and a second connection portion, the first and second connection portion respectively comprise a flat or substantially flat first and a second connection side mutually facing and in contact with each other when the at least one blocking element blocks the second part of arm in the first angular position, wherein said rotation pin crosses the first and second connection side and wherein said stop pin is rigidly connected to one out of the first and the second part of arm at one of said connection sides; and
further comprising a protective sleeve configured to be fitted around the first and second connection portion when the second part of arm assumes the first angular position.

15. A vehicle provided with a steering handlebar and a seat astride which a driver of the vehicle may sit, said vehicle comprising a windscreen safety assembly, wherein the windscreen safety assembly comprises:
a windscreen panel;
a support arm to support the windscreen panel, the support arm comprising a first part of arm configured to be attached to a vehicle, and a second part of arm attached to the windscreen panel, the vehicle provided with a steering handlebar and a seat astride which a driver of the vehicle may sit;

at least one coupling element to rotatably couple the second part of arm to the first part of arm so that the second part of arm is suitable to rotate around a rotation axis from a first angular position to a second angular position in a first direction and from the second angular position toward the first angular position in a second direction opposite the first direction, the first and second angular positions being positions distinct from each other;

at least one blocking element provided to block the second part of arm in the first angular position in a releasable manner; and stop elements operatively positioned between the first and the second part of arm to prevent the second part of arm from rotating in said second direction starting from the first angular position, the stop elements being distinct from the at least one coupling element and distanced from the at least one coupling element; and wherein, considering the windscreen safety assembly mounted on the vehicle in a normal condition of use, in the first angular position, the second part of arm is substantially vertical, and in the second angular position, the second part of arm is substantially horizontal.

16. The windscreen safety assembly according to claim 5, wherein the first part of arm and the second part of arm each comprise a first sub-portion and a second sub-portion, wherein the first sub-portion of the first part of arm comprises a side wall and wherein the second sub-portion of the first part of arm comprises a stiffening plate that comprises the first connection portion and that is fixed to the side wall of the first part of arm, wherein the first sub-portion of the second part of arm comprises the second connection portion and the second sub-portion of the second part of arm comprises an end portion, the second connection portion comprising a fixing portion to which is fixed the end portion of the second sub-portion of the second part of arm and which defines a fixing recess in which such end portion is received.

17. The windscreen safety assembly according to claim 5, comprising a protective sleeve configured to be fitted around the first and second connection portion when the second part of arm assumes the first angular position.

* * * * *